United States Patent
Senf, Jr.

(10) Patent No.: US 10,759,326 B2
(45) Date of Patent: Sep. 1, 2020

(54) METHOD FOR DETERMINING REDUCED AIRFLOW IN TRANSPORT REFRIGERATION SYSTEM

(71) Applicant: CARRIER CORPORATION, Palm Beach Gardens, FL (US)

(72) Inventor: Raymond L. Senf, Jr., Central Sqaure, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 87 days.

(21) Appl. No.: 16/301,856

(22) PCT Filed: May 26, 2017

(86) PCT No.: PCT/US2017/034615
§ 371 (c)(1),
(2) Date: Nov. 15, 2018

(87) PCT Pub. No.: WO2017/205711
PCT Pub. Date: Nov. 30, 2017

(65) Prior Publication Data
US 2019/0283650 A1 Sep. 19, 2019

Related U.S. Application Data

(60) Provisional application No. 62/342,530, filed on May 27, 2016.

(51) Int. Cl.
*B60P 3/20* (2006.01)
*G01F 1/69* (2006.01)

(52) U.S. Cl.
CPC . *B60P 3/20* (2013.01); *G01F 1/69* (2013.01)

(58) Field of Classification Search
CPC ..... B60P 3/20; F24F 2221/12; F25B 2500/04; B60H 1/00014; B60H 1/00264; B60H 1/3232
See application file for complete search history.

(56) References Cited

U.S. PATENT DOCUMENTS 3,220,208 A   11/1965 Oram et al.
3,818,758 A    6/1974 Easter
(Continued)

FOREIGN PATENT DOCUMENTS

EP    0787961 A2    8/1997
EP    1466764 A1   10/2004
(Continued)

OTHER PUBLICATIONS

JP 2015-141223 (English Abstract) (Year: 2015).*
(Continued)

*Primary Examiner* — Jonathan Bradford
(74) *Attorney, Agent, or Firm* — Cantor Colburn LLP

(57) ABSTRACT

A method of detecting airflow blockage of a transport refrigeration system including the steps of: activating a heater powered by an electric generation device; measuring an output voltage of the electric generation device; determining a predicted heat output of the heater in response to the output voltage; determining a predicted temperature rise across the heater in response to the predicted heat output; detecting a measured temperature rise across the heater; and determining an airflow reduction percentage in response to the predicted temperature rise across the heater and the measured temperature rise across the heater.

18 Claims, 3 Drawing Sheets

(56) References Cited

U.S. PATENT DOCUMENTS

| | | | |
|---|---|---|---|
| 5,440,890 | A | 8/1995 | Bahel et al. |
| 6,701,725 | B2 | 3/2004 | Rossi et al. |
| 2006/0010973 | A1 | 1/2006 | Brown |
| 2006/0100796 | A1 | 5/2006 | Fraden et al. |
| 2006/0117844 | A1 | 6/2006 | Birkle et al. |
| 2011/0302937 | A1 | 12/2011 | Bujak, Jr. |
| 2012/0260727 | A1* | 10/2012 | Kinkade, Jr. ...... B01D 46/0086 73/204.27 |
| 2013/0086929 | A1 | 4/2013 | Senf, Jr. |
| 2013/0247598 | A1 | 9/2013 | Fulmer et al. |
| 2014/0157809 | A1* | 6/2014 | Crombie ................ F25D 29/00 62/129 |
| 2016/0025397 | A1* | 1/2016 | Burnham ................ H02P 9/04 62/115 |

FOREIGN PATENT DOCUMENTS

| | | |
|---|---|---|
| FR | 2991441 A1 | 12/2013 |
| WO | 2009024302 A1 | 2/2009 |
| WO | 2015022638 A1 | 2/2015 |

OTHER PUBLICATIONS

Notification of Transmittal of the International Search Report and the Written Opinion of the International Searching Authority, or the Declaration for International Application No. PCT/US2017/034615; Report dated Aug. 21, 2017; Report Received Date: Aug. 21, 2017; 11 pages.

* cited by examiner

METHOD FOR DETERMINING REDUCED AIRFLOW IN TRANSPORT REFRIGERATION SYSTEM

BACKGROUND OF THE DISCLOSURE

The embodiments herein generally relate to transport refrigeration systems and more specifically, the method and apparatus for detecting airflow blockage of such systems.

Typically, transport refrigeration systems are used to transport and distribute cargo, or more specifically perishable goods and environmentally sensitive goods (herein referred to as perishable goods) that may be susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, transport refrigeration systems allow perishable goods to be effectively transported and distributed without damage or other undesirable effects.

Refrigerated trucks and trailers are commonly used to transport perishable goods in a cold chain distribution system. A transport refrigeration system is mounted to the truck or to the trailer in operative association with a cargo space defined within the truck or trailer for maintaining a controlled temperature environment within the cargo space.

Conventionally, transport refrigeration systems used in connection with refrigerated trucks and refrigerated trailers include a refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

On commercially available transport refrigeration systems used in connection with refrigerated trucks and refrigerated trailers, the compressor, and typically other components of the refrigeration unit, must be powered during transit by a prime mover. In the case of refrigerated trailers, the prime mover typically comprises a diesel engine carried on and considered part of the transport refrigeration system. In mechanically driven transport refrigeration systems the compressor is driven by the diesel engine, either through a direct mechanical coupling or a belt drive, and other components, such as the condenser and evaporator fans are belt driven.

An "all electric" transport refrigeration system for a refrigerated trailer application is also commercially available through Carrier Corporation. In the all electric transport refrigeration system, a prime mover, most commonly a diesel engine, carried on and considered part of the transport refrigeration system, drives an AC synchronous generator that generates AC power. The generated AC power is used to power an electric compressor motor for driving the refrigerant compressor of the refrigeration unit and also powering electric AC fan motors for driving the condenser and evaporator motors and electric heaters associated with the evaporator. For example, U.S. Pat. No. 6,223,546 discloses an all electric transport refrigeration system.

A return air inlet for return air and/or outlet for supply air of the refrigeration system may become blocked on some transport refrigeration systems. This blockage may lead to reduced airflow through the refrigeration unit, which may inhibit performance of the refrigeration unit and the transport refrigeration system. Thus, creating a higher than desired temperature in the cargo space for the perishable goods and increasing the risk of the perishable goods spoiling.

BRIEF DESCRIPTION OF THE DISCLOSURE

According to one embodiment, a method of detecting airflow blockage of a transport refrigeration system is provided. The method including the steps of: activating a heater powered by an electric generation device; measuring an output voltage of the electric generation device; determining a predicted heat output of the heater in response to the output voltage; determining a predicted temperature rise across the heater in response to the predicted heat output; detecting a measured temperature rise across the heater; and determining an airflow reduction percentage in response to the predicted temperature rise across the heater and the measured temperature rise across the heater.

In addition to one or more of the features described above, or as an alternative, further embodiments of the method may include activating an alarm when the airflow reduction percentage is outside a selected percentage range.

In addition to one or more of the features described above, or as an alternative, further embodiments of the method may include that the detecting further includes: sensing a return airflow temperature of the refrigeration system; sensing a supply airflow temperature of the refrigeration system; and calculating a difference between the return airflow temperature and the supply airflow temperature.

In addition to one or more of the features described above, or as an alternative, further embodiments of the method may include that determining the airflow reduction percentage further includes: calculating a difference in the predicted temperature rise across the heater and the actual temperature rise across the heater.

In addition to one or more of the features described above, or as an alternative, further embodiments of the method may include that the heater is an electric resistance heater.

In addition to one or more of the features described above, or as an alternative, further embodiments of the method may include that the heat output is a resistance of the electric resistance heater.

According to one embodiment, a controller of a transport refrigeration system is provided. The controller having: a processor; and a memory comprising computer-executable instructions that, when executed by the processor, cause the processor to perform operations. The operations including the steps of: activating a heater powered by an electric generation device; measuring an output voltage of the electric generation device; determining a predicted heat output of the heater in response to the output voltage; determining a predicted temperature rise across the heater in response to the predicted heat output; detecting a measured temperature rise across the heater; and determining an airflow reduction percentage in response to the predicted temperature rise across the heater and the measured temperature rise across the heater.

In addition to one or more of the features described above, or as an alternative, further embodiments of the controller may include that the operation further include the step of activating an alarm when the airflow reduction percentage is outside a selected percentage range.

In addition to one or more of the features described above, or as an alternative, further embodiments of the controller may include that detecting further includes: sensing a return airflow temperature of the refrigeration system; sensing a supply airflow temperature of the refrigeration system; and calculating a difference between the return airflow temperature and the supply airflow temperature.

In addition to one or more of the features described above, or as an alternative, further embodiments of the controller may include that the determining the airflow reduction percentage further includes calculating a difference in the predicted temperature rise across the heater and the actual temperature rise across the heater.

In addition to one or more of the features described above, or as an alternative, further embodiments of the controller may include that the heater is an electric resistance heater.

In addition to one or more of the features described above, or as an alternative, further embodiments of the controller may include that the heat output is a resistance of the electric resistance heater.

According to one embodiment, a computer program product tangibly embodied on a computer readable medium. The computer program product including instructions that, when executed by a processor, cause the processor to perform operations. The operations including the steps of: activating a heater powered by an electric generation device; measuring an output voltage of the electric generation device; determining a predicted heat output of the heater in response to the output voltage; determining a predicted temperature rise across the heater in response to the predicted heat output; detecting a measured temperature rise across the heater; and determining an airflow reduction percentage in response to the predicted temperature rise across the heater and the measured temperature rise across the heater.

In addition to one or more of the features described above, or as an alternative, further embodiments of the computer program may include that the operations further include: activating an alarm when the airflow reduction percentage is outside a selected percentage range.

In addition to one or more of the features described above, or as an alternative, further embodiments of the computer program may include that the detecting further includes: sensing a return airflow temperature of the refrigeration system; sensing a supply airflow temperature of the refrigeration system; and calculating a difference between the return airflow temperature and the supply airflow temperature.

In addition to one or more of the features described above, or as an alternative, further embodiments of the computer program may include that determining the airflow reduction percentage further includes: calculating a difference in the predicted temperature rise across the heater and the actual temperature rise across the heater.

In addition to one or more of the features described above, or as an alternative, further embodiments of the computer program may include that the heater is an electric resistance heater.

In addition to one or more of the features described above, or as an alternative, further embodiments of the computer program may include that the heat output is a resistance of the electric resistance heater.

Technical effects of embodiments of the present disclosure include detecting airflow blockage in the transport refrigeration system based on an irregularity in heat output of a heater, which is determined using a measured voltage, a known heat output based on the measured voltage, and a measured delta temperature across the heater.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION OF THE DISCLOSURE

Figure 1:
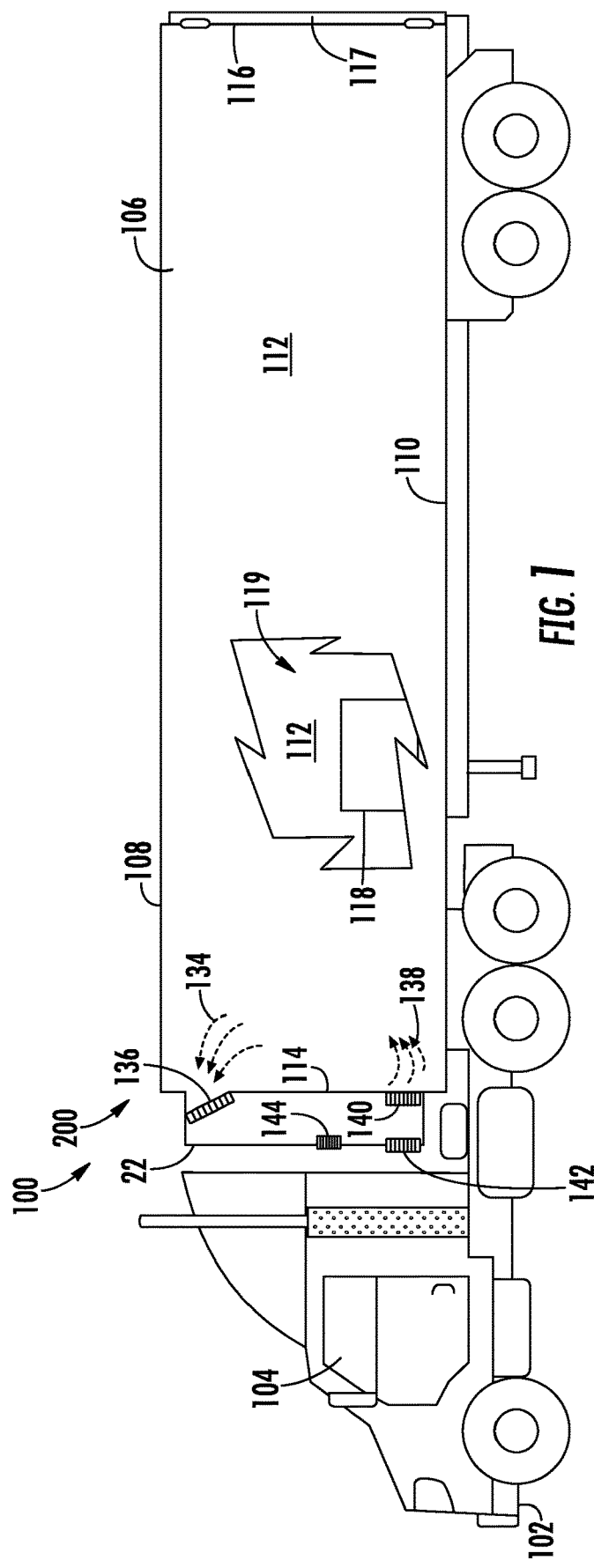
FIG. 1 is a schematic illustration of a transport refrigeration system, according to an embodiment of the present disclosure.
Figure 2:
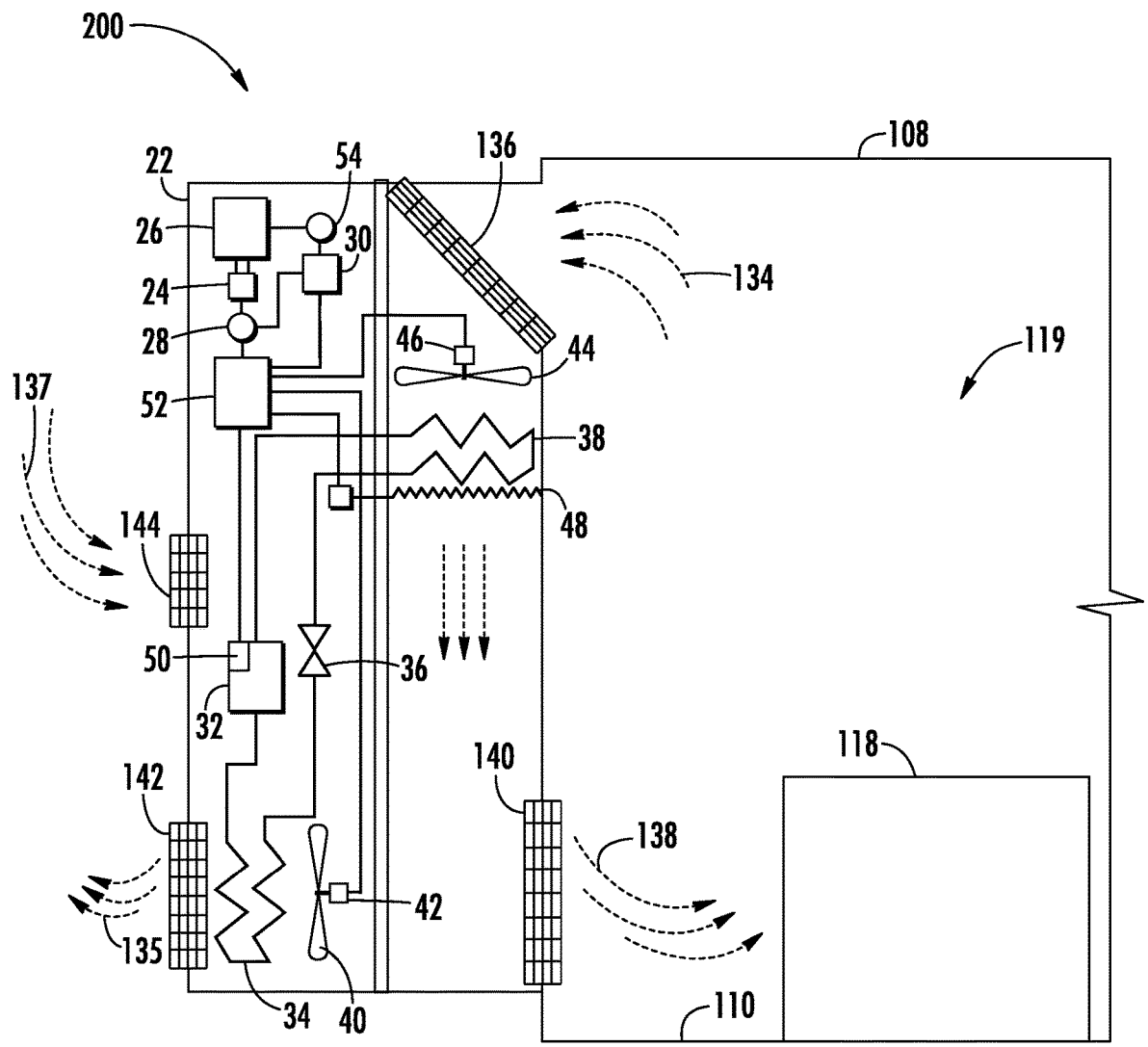
FIG. 2 is an enlarged schematic illustration of the transport refrigeration system of FIG. 1, according to an embodiment of the present disclosure.

Referring to FIGS. 1 and 2. FIG. 1 shows a schematic illustration of a transport refrigeration system 200, according to an embodiment of the present disclosure. FIG. 2 shows an enlarged schematic illustration of the transport refrigeration system 200 of FIG. 1, according to an embodiment of the present disclosure. The transport refrigeration system 200 is being illustrated as a trailer system 100 as seen in FIG. 1. The trailer system 100 includes a tractor 102 and a transport container 106. The tractor 102 includes an operator's compartment or cab 104 and an engine (not shown), which acts as the drive system of the trailer system 100. The transport container 106 is coupled to the tractor 102. The transport container 106 is a refrigerated trailer and includes a top wall 108, a directly opposed bottom wall 110, opposed side walls 112, and a front wall 114, with the front wall 114 being closest to the tractor 102. The transport container 106 further includes a door or doors 117 at a rear wall 116, opposite the front wall 114. The walls of the transport container 106 define a refrigerated cargo space 119. It is appreciated by those of skill in the art that embodiments described herein may be applied to shipping containers that are shipped by rail, sea, or any other suitable container, without use of a tractor 102.

Typically, transport refrigeration systems 200 are used to transport and distribute perishable goods and environmentally sensitive goods (herein referred to as perishable goods 118). The perishable goods 118 may include but are not limited to fruits, vegetables, grains, beans, nuts, eggs, dairy, seed, flowers, meat, poultry, fish, ice, blood, pharmaceuticals, or any other suitable cargo requiring refrigerated transport. The transport refrigeration system 200 includes a refrigeration unit 22, an electric generation device 24, a prime mover 26 for driving the electric generation device 24, and a controller 30. The refrigeration unit 22 functions, under the control of the controller 30, to establish and regulate a desired environmental parameters, such as, for example temperature, pressure, humidity, carbon dioxide, ethylene, ozone, light exposure, vibration exposure, and other conditions in the interior compartment 119 as known to one of ordinary skill in the art. In an embodiment, the refrigeration unit 22 is a refrigeration system capable of providing a desired temperature and humidity range.

The refrigeration unit 22 includes a refrigerant compression device 32, a refrigerant heat rejection heat exchanger 34, an expansion device 36, and a refrigerant heat absorption heat exchanger 38 connected in refrigerant flow communication in a closed loop refrigerant circuit and arranged in a conventional refrigeration cycle. The refrigeration unit 22 also includes one or more fans 40 associated with the refrigerant heat rejection heat exchanger 34 and driven by fan motor(s) 42 and one or more fans 44 associated with the refrigerant heat absorption heat exchanger 38 and driven by fan motor(s) 46. The refrigeration unit 22 may also include a heater 48 associated with the refrigerant heat absorption heat exchanger 38. In an embodiment, the heater 48 may be an electric resistance heater. It is to be understood that other components (not shown) may be incorporated into the refrigerant circuit as desired, including for example, but not limited to, a suction modulation valve, a receiver, a filter/dryer, an economizer circuit.

The refrigerant heat rejection heat exchanger 34 may, for example, comprise one or more refrigerant conveying coiled tubes or one or more tube banks formed of a plurality of refrigerant conveying tubes across flow path to the heat outlet 142. The fan(s) 40 are operative to pass air, typically ambient air, across the tubes of the refrigerant heat rejection heat exchanger 34 to cool refrigerant vapor passing through the tubes. The refrigerant heat rejection heat exchanger 34 may operate either as a refrigerant condenser, such as if the refrigeration unit 22 is operating in a subcritical refrigerant cycle or as a refrigerant gas cooler, such as if the refrigeration unit 22 is operating in a transcritical cycle.

The refrigerant heat absorption heat exchanger 38 may, for example, also comprise one or more refrigerant conveying coiled tubes or one or more tube banks formed of a plurality of refrigerant conveying tubes extending across flow path from a return air inlet 136. The fan(s) 44 are operative to pass air drawn from the refrigerated cargo space 119 across the tubes of the refrigerant heat absorption heat exchanger 38 to heat and evaporate refrigerant liquid passing through the tubes and cool the air. The air cooled in traversing the refrigerant heat rejection heat exchanger 38 is supplied back to the refrigerated cargo space 119 through a refrigeration unit outlet 140. It is to be understood that the term "air" when used herein with reference to the atmosphere within the cargo box includes mixtures of air with other gases, such as for example, but not limited to, nitrogen or carbon dioxide, sometimes introduced into a refrigerated cargo box for transport of perishable produce.

The refrigerant compression device 32 may comprise a single-stage or multiple-stage compressor such as, for example, a reciprocating compressor or a scroll compressor. The compression device 32 has a compression mechanism (not shown) driven by an electric motor 50. In an embodiment, the motor 50 may be disposed internally within the compressor with a drive shaft interconnected with a shaft of the compression mechanism, all sealed within a common housing of the compression device 32.

The transport refrigeration system 200 also includes a controller 30 configured for controlling operation of the transport refrigeration system 200 including, but not limited to, operation of various components of the refrigerant unit 22 to provide and maintain a desired thermal environment within the refrigerated cargo space 119. The controller 30 may also be able to selectively operate the prime mover 26, typically through an electronic engine controller 54 operatively associated with the prime mover 26. The controller 30 may be an electronic controller including a processor and an associated memory comprising computer-executable instructions that, when executed by the processor, cause the processor to perform various operations. The a processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium.

The refrigeration unit 22 has a plurality of power demand loads, including, but not limited to, the compression device drive motor 50, the drive motor 42 for the fan 40 associated with the refrigerant heat rejection heat exchanger 34, and the drive motor 46 for the fan 44 associated with the refrigerant heat absorption heat exchanger 38. In the depicted embodiment, the heater 48 also constitutes a power demand load. The electric resistance heater 28 may be selectively operated by the controller 30 whenever a control temperature within the temperature controlled cargo box drops below a preset lower temperature limit, which may occur in a cold ambient environment. In such an event the controller 30 would activate the heater 48 to heat air circulated over the heater 48 by the fan(s) 44 associated with the refrigerant heat absorption heat exchanger 38. The heater 48 may also be used to de-ice the return air intake 136.

The prime mover 26, which comprises an on-board fossil-fuel engine, most commonly a diesel engine, drives the electric generation device 24 that generates electrical power. The drive shaft of the engine drives the shaft of the electric generation device 24. In an electrically powered embodiment of the refrigeration unit 20, the electric generation device 24 may comprise a single on-board, engine driven AC generator configured to generate alternating current (AC) power including at least one AC voltage at one or more frequencies. In an embodiment, the electric generation device 24 may, for example, be a permanent magnet AC generator or a synchronous AC generator. In another embodiment, the electric generation device 24 may comprise a single on-board, engine driven DC generator configured to generate direct current (DC) power at at least one voltage. Some electric generation devices may have internal voltage regulators while other electric generation devices do not. In another embodiment, the electric generation device 24 does not contain an internal voltage regulator and thus the voltage of the electric generation device 24 is unregulated by the electric generation device 23 itself. As each of the fan motors 42, 46 and the compression device drive motor 50 may be an AC motor or a DC motor, it is to be understood that various power converters 52, such as AC to DC rectifiers, DC to AC inverters, AC to AC voltage/frequency converters, and DC to DC voltage converters, may be employed in connection with the electric generation device 24 as appropriate. The transport refrigeration system 200 may include a voltage sensor 28 to sense the voltage of the electric generation device 24.

Airflow is circulated into and through the refrigerate cargo space 119 of the transport container 106 by means of the refrigeration unit 22. A return airflow 134 flows into the refrigeration unit 22 from the refrigerated cargo space 119 through the refrigeration unit return air intake 136, and across the refrigerant heat absorption heat exchanger 38 via the fan 44, thus conditioning the return airflow 134 to a selected or predetermined temperature. The conditioned return airflow 134, now referred to as supply airflow 138, is supplied into the refrigerated cargo space 119 of the transport container 106 through the refrigeration unit outlet 140, which in some embodiments is located near the bottom wall 110 of the container system 106. Heat 135 is removed from the refrigerant heat rejection heat exchanger 34 through the heat outlet 142. The refrigeration unit 22 may contain an external air inlet 144, as shown in FIG. 2, to aid in the removal of heat 135 from the refrigerant heat rejection heat exchanger 34 by pulling in external air 137. The supply airflow 138 cools the perishable goods 118 in the refrigerated cargo space 119 of the transport container 106. It is to be appreciated that the refrigeration unit 22 can further be operated in reverse to warm the container system 106 when, for example, the outside temperature is very low. In the illustrated embodiment, the return air intake 136, the refrigeration unit outlet 140, the heat outlet 142, and the external air inlet 144 are configured as grilles to help prevent foreign objects from entering the refrigeration unit 22.

Figure 3:
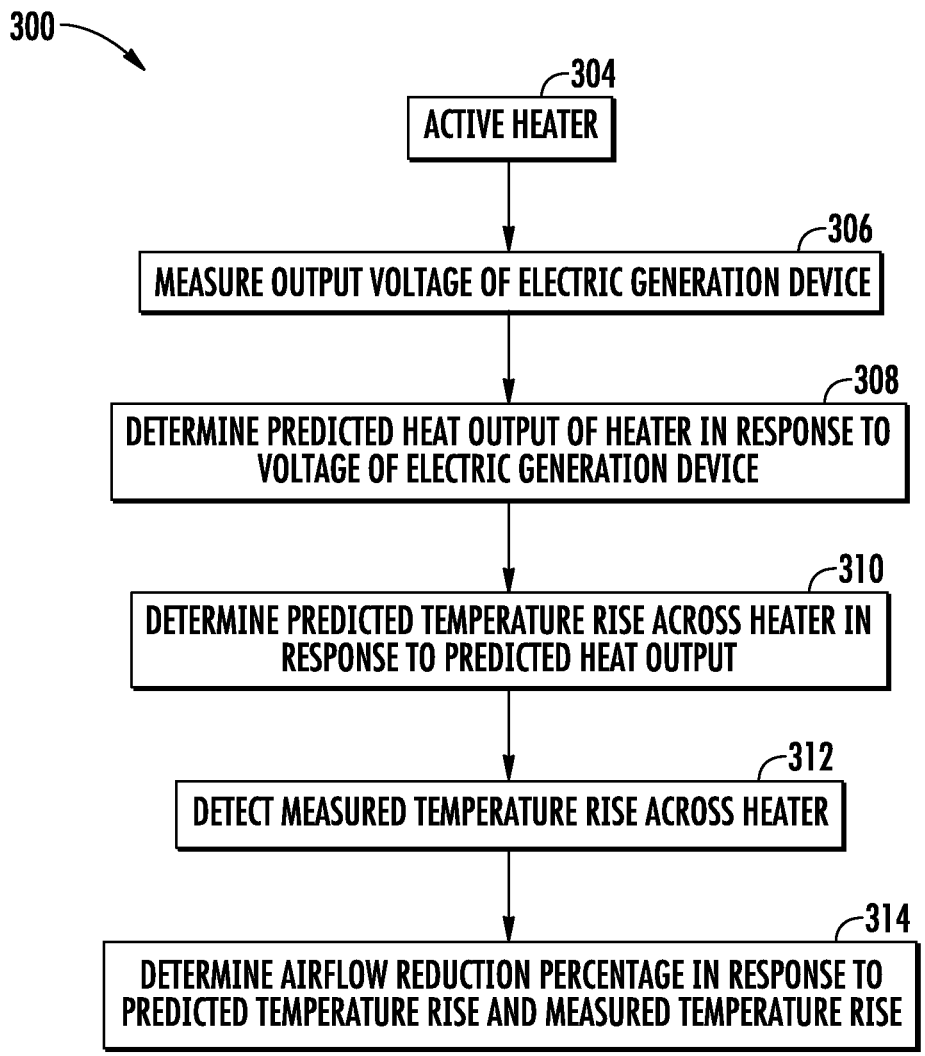
FIG. 3 is a flow diagram illustrating a method of detecting an airflow blockage of the transport refrigeration system of FIG. 1, according to an embodiment of the present disclosure.

Referring now also to FIG. 3, which shows a flow diagram illustrating a method 300 of detecting airflow blockage of the transport refrigeration system 200 of FIG. 1. The grilles of the return air intake 136 and/or the refrigeration unit outlet 140 may become blocked and FIG. 3 illustrates a method 300 to detect the airflow blockages. The blockage may be due to various causes including but not limited to ice buildup, dirt, dust, debris, packaging material, perishable good 118 or any other loose article in the refrigerated cargo space 119. As may be appreciated by one of ordinary skill in the art, the steps of method 300 may be controlled by the controller 30 and/or may be instructions tangibly embodied on a computer readable medium as part of a computer program that is executed by a processor. The method 300 initiates at block 304 when the heater 48 is activated. The method 300 may be initiated at multiple different times such as, for example, as a part of a startup check list for the refrigeration unit 22, as part of a heating cycle of the refrigeration unit 22, as a part of the defrost cycle of the refrigeration unit 22, or at any other suitable time as may be known by one of ordinary skill in the art. Once the heater 48 is activated at block 304, an output voltage of the electric generation device 24 is measured at block 306. As described above, the heater 48 is powered by the electric generation device 24. The speed of the prime mover 26 may affect the output voltage of the electric generation device 24, which subsequently affects the heat output of the heater 48. For example the prime mover 26 may have a high speed setting and a low speed setting. Further, when the prime mover 26 is in high speed, the electric generation device 24 may produce six kilowatts and when the prime mover 26 is in low speed, the electric generation device 24 may produce three kilowatts. In an embodiment, the heater 48 may be an electric resistance heater.

Next at block 308, a predicted heat output of the heater 48 is determined in response to the output voltage. The predicted heat output may be determined using an executable algorithm and/or a look up table that may be stored within the memory of the controller 30. In an embodiment, the heat output may be a resistance of the heater 48. Then at block 310, a predicted temperature rise across the heater 48 is determined in response to the predicted heat output. The predicted temperature rise may be determined using an executable algorithm and/or a look up table that may be stored within the memory of the controller 30. Next at block 312, a measured temperature rise across the heater 48 is detected. In an embodiment, the measured temperature rise may be detected at block 312 by sensing a return airflow 134 temperature of the refrigeration system 200; sensing a supply airflow 138 temperature of the refrigeration system 200; and calculating a difference between the return airflow 134 temperature and the supply airflow 138 temperature.

Finally, at block 314, an airflow reduction percentage is determined in response to the predicted temperature rise across the heater 48 and the measured temperature rise across the heater 48. An airflow reduction percentage outside of a selected percentage range indicates a blockage of the return air intake 136 and/or the refrigeration unit outlet 140. The airflow reduction percentage may be determined using an executable algorithm and/or a look up table that may be stored within the memory of the controller 30. In an embodiment, the airflow reduction percentage may be determined by calculating a difference in the predicted temperature rise across the heater 48 and the actual temperature rise across the heater 48 a temperature.

Once the reduction percentage has been determined at block 314, an alarm (not shown) may be activated when the airflow reduction percentage is outside a selected percentage range. The alarm may be acoustic and/or visual alert. The alarm may alert on the refrigeration unit 22 and/or a user device such as, for example a cellular phone, pager, tablet, laptop, smartwatch, desktop computer, truck dashboard display or any similar device known to one of ordinary skill in the art.

While the above description has described the flow process of FIG. 3 in a particular order, it should be appreciated that unless otherwise specifically required in the attached claims that the ordering of the steps may be varied.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A method of detecting airflow blockage of a transport refrigeration system, the method comprising:
    activating a heater powered by an electric generation device;
    measuring an output voltage of the electric generation device;
    determining a predicted heat output of the heater in response to the output voltage;
    determining a predicted temperature rise across the heater in response to the predicted heat output;
    detecting a measured temperature rise across the heater; and
    determining an airflow reduction percentage in response to the predicted temperature rise across the heater and the measured temperature rise across the heater.

2. The method of claim 1, further comprising:
activating an alarm when the airflow reduction percentage is outside a selected percentage range.

3. The method of claim 1, wherein the detecting further comprises:
sensing a return airflow temperature of the refrigeration system;
sensing a supply airflow temperature of the refrigeration system; and
calculating a difference between the return airflow temperature and the supply airflow temperature.

4. The method of claim 1, wherein the determining the airflow reduction percentage further comprises:
calculating a difference in the predicted temperature rise across the heater and the actual temperature rise across the heater.

5. The method of claim 1, wherein:
the heater is an electric resistance heater.

6. The method of claim 5, wherein:
the heat output is a resistance of the electric resistance heater.

7. A controller of a transport refrigeration system comprising:
a processor;
a memory comprising computer-executable instructions that, when executed by the processor, cause the processor to perform operations, the operations comprising:
activating a heater powered by an electric generation device;
measuring an output voltage of the electric generation device;
determining a predicted heat output of the heater in response to the output voltage;
determining a predicted temperature rise across the heater in response to the predicted heat output;
detecting a measured temperature rise across the heater; and
determining an airflow reduction percentage in response to the predicted temperature rise across the heater and the measured temperature rise across the heater.

8. The controller of claim 7, wherein the operations further comprise:
activating an alarm when the airflow reduction percentage is outside a selected percentage range.

9. The controller of claim 7, wherein the detecting further comprises:
sensing a return airflow temperature of the refrigeration system;
sensing a supply airflow temperature of the refrigeration system; and
calculating a difference between the return airflow temperature and the supply airflow temperature.

10. The controller of claim 7, wherein the determining the airflow reduction percentage further comprises:
calculating a difference in the predicted temperature rise across the heater and the actual temperature rise across the heater.

11. The controller of claim 7, wherein:
the heater is an electric resistance heater.

12. The controller of claim 11, wherein:
the heat output is a resistance of the electric resistance heater.

13. A computer program product tangibly embodied on a computer readable medium, the computer program product including instructions that, when executed by a processor, cause the processor to perform operations comprising:
activating a heater powered by an electric generation device;
measuring an output voltage of the electric generation device;
determining a predicted heat output of the heater in response to the output voltage;
determining a predicted temperature rise across the heater in response to the predicted heat output;
detecting a measured temperature rise across the heater; and
determining an airflow reduction percentage in response to the predicted temperature rise across the heater and the measured temperature rise across the heater.

14. The computer program of claim 13, wherein the operations further comprise:
activating an alarm when the airflow reduction percentage is outside a selected percentage range.

15. The computer program of claim 13, wherein the detecting further comprises:
sensing a return airflow temperature of the refrigeration system;
sensing a supply airflow temperature of the refrigeration system; and
calculating a difference between the return airflow temperature and the supply airflow temperature.

16. The computer program of claim 13, wherein the determining the airflow reduction percentage further comprises:
calculating a difference in the predicted temperature rise across the heater and the actual temperature rise across the heater.

17. The computer program of claim 13, wherein:
the heater is an electric resistance heater.

18. The computer program of claim 17, wherein:
the heat output is a resistance of the electric resistance heater.

* * * * *